United States Patent [19]
Vuorinen

[11] Patent Number: 5,681,429
[45] Date of Patent: Oct. 28, 1997

[54] MIXING DEVICE IN PULPING

[75] Inventor: Timo Vuorinen, Tampere, Finland

[73] Assignee: Valmet Paper Machinery Inc., Helsinki, Finland

[21] Appl. No.: 411,829

[22] PCT Filed: Oct. 11, 1993

[86] PCT No.: PCT/FI93/00411

§ 371 Date: Apr. 26, 1995

§ 102(e) Date: Apr. 26, 1995

[87] PCT Pub. No.: WO94/09202

PCT Pub. Date: Apr. 28, 1994

[30] Foreign Application Priority Data

Oct. 20, 1992 [FI] Finland ................ 924742

[51] Int. Cl.⁶ ........................................ D21D 5/00
[52] U.S. Cl. ................ 162/261; 162/55; 162/251; 241/21; 241/24; 241/29; 241/68; 241/69; 241/79; 241/79.1
[58] Field of Search ................ 162/4.55, 52, 251, 162/261, 246; 241/24, 29, 21, 68, 69, 79, 79.1

[56] References Cited

U.S. PATENT DOCUMENTS 4,604,193 8/1986 Lamort .................. 209/273

FOREIGN PATENT DOCUMENTS

| 0 279 022 | 8/1988 | European Pat. Off. . |
| 75001 | 4/1988 | Finland . |
| 1541189 | 10/1968 | France ............... 162/55 |
| 33 34 448 | 4/1984 | Germany . |
| 34 40 005 | 10/1987 | Germany . |
| 33 11 082 | 5/1989 | Germany . |

*Primary Examiner*—Peter Chin
*Attorney, Agent, or Firm*—Pollock, Vande Sande & Priddy

[57] ABSTRACT

A device for use in a pulping process comprises first and second pulping units for processing feed material. A flow path connects the first pulping unit to the second pulping unit for transporting material between the units. The second pulping unit has devices for separating pulped material into a first material component comprising waste matter collected at the bottom of the second pulping unit, a second material component comprising sieved pulped material and third material component comprising unsieved pulped material. The second and third material component are separated from the first material component and are transported as a unitary flow to a primary space. Mixing and sieving devices are located in the primary space for separating the second material component from the first material component. The second material component comprises material which passes the sieving device and the third material component comprises material which does not pass the sieving device. A third material component transfer device transfers the third material component to a pre-sieving for further processing and an outlet assembly transfers the second material component downstream of the sieving device.

9 Claims, 2 Drawing Sheets

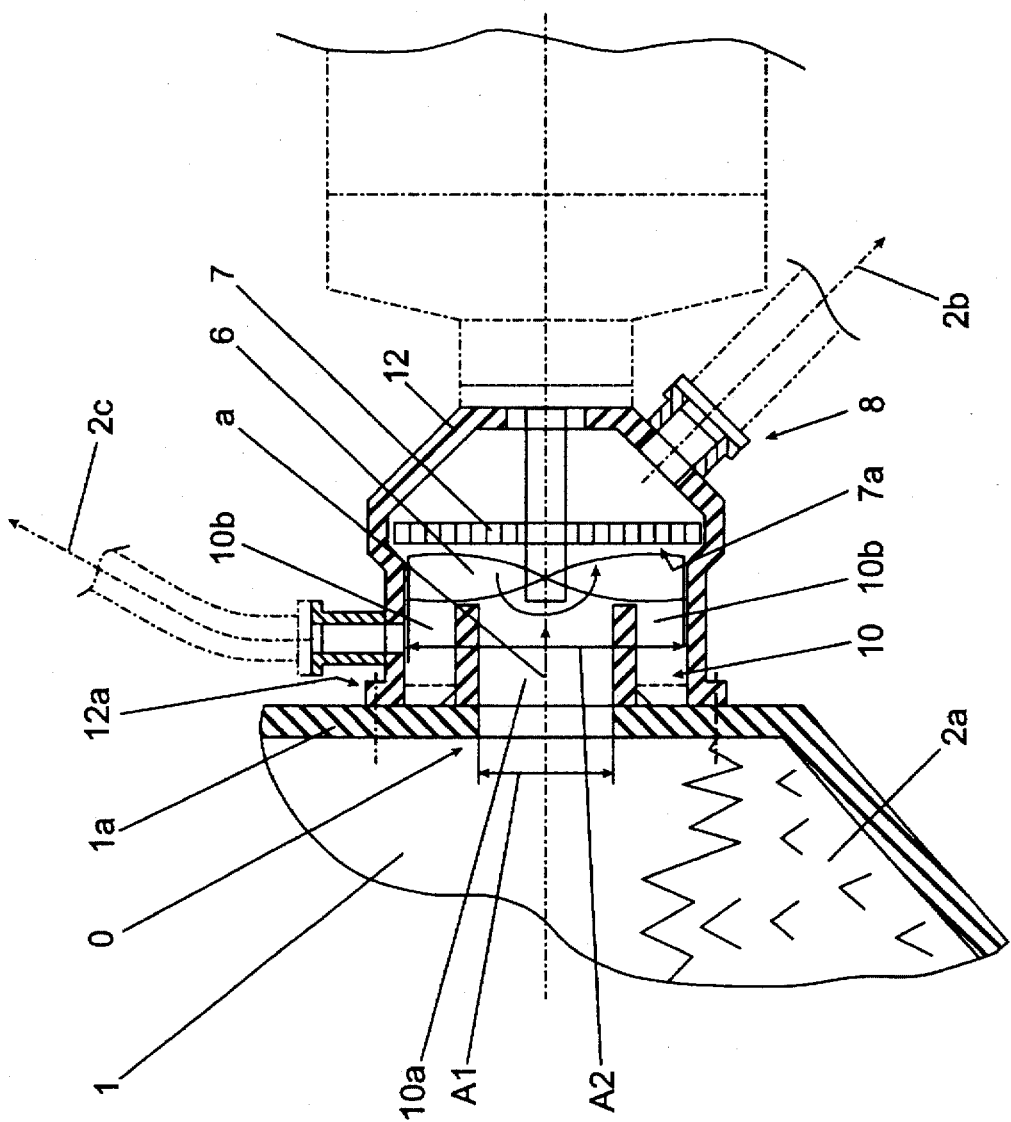

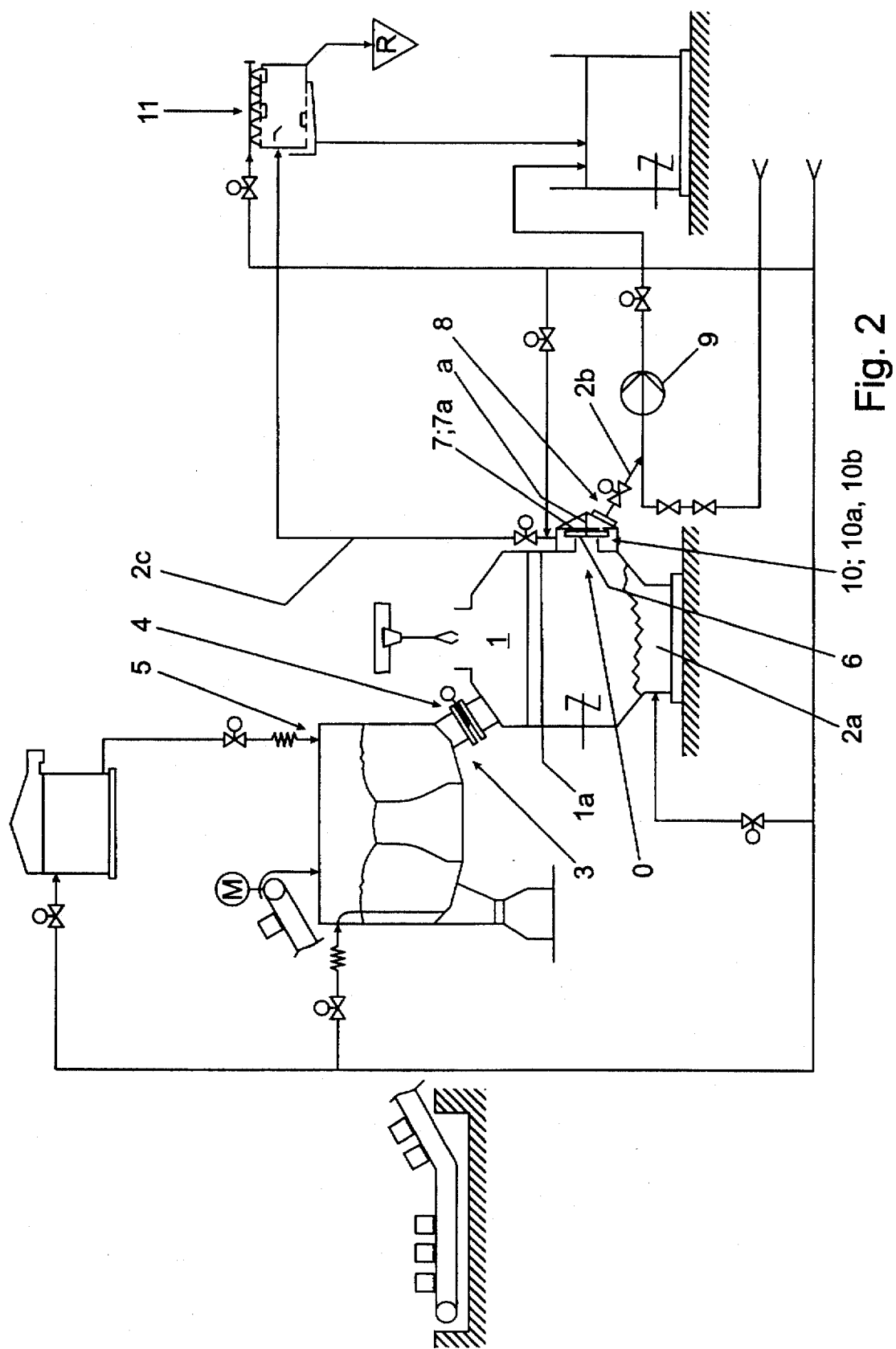

MIXING DEVICE IN PULPING

BACKGROUND OF THE INVENTION

This invention relates to a mixing device in pulping, which is intended to be placed a the second pulping space, such as a sieving or intermediate tank, basin or the like, for pulping at least at the second stage, the waste matter of the pulping material accumulated on the bottom thereof for discharge. For receiving pre-pulped material, the second pulping space is provided with flow means, such as a tube, channel or the like, preferably periodically by a valve arrangement or the like, in connection with the first pulping space, such as a pre-slusher, pre-pulper or the like for pulping at least at the first stage. The mixing device comprises a mixing means with blades or the like which are arranged to rotate on a primary side of a sieving means, such as a punched plate, screen plate or the like, whereby the pulped material, having passed through the sieving means, is conveyed from a secondary side of the sieving means for further processing via an outlet assembly by a suction effect, such as that caused by gravitation, a pump or the like.

A secondary pulping space to be filled periodically as described above is generally used in the processing of a relatively thick mass, whereby the dry matter content of pre-pulped mass preferably exceeds 10%. This kind of mass is produced e.g. in pre-pulping of waste paper. In multi-stage pulping, it is not necessary to use a sieve plate in the pre-pulper, whereby crude mass can also be transferred to further pulping stages, where the actual sieving is carried out.

Finnish Patent Publication No. 75001 discloses an advanced method with regard to conventional methods, and a device for sieving out impurities mixed in paper pulp. In this method, the mixture is transferred from the pre-pulper, periodically carrying out pulping at the first stage, to a device equipped with a closed pulping space. This pulping space is provided with a sieve plate and a spiral mixer which rotates at a short distance from the surface of the sieve plate. The admitted mass is discharged behind the sieve plate for example by the suction effect of a discharge pump. For diluting the mixture, water is added upon feeding the mixture into the pulping space. The addition of water is continued all the way to washing out the waste pulp, whereby the addition of water is discontinued and the pulping space is discharged of water. Next, the waste pulp, accumulated to the bottom of the pulping stage, is discharged by gravity through a wide opening at the bottom of the pulping space.

For certain parts, the solution described above undoubtedly is advantageous over prior techniques. One advantage is that the described solution can be used to make the pulping space substantially smaller than the pre-pulper, because the whole contents of the pre-pulper do not need to be received in the pulping space at one time. This is based on the fact that the mixer of the pulping space and the discharge pump are set into action when feeding of the mixture from the pre-pulper into the pulping space is started. Another advantage of the presented solution is that the pulping space can be arranged to be filled with water before the mixture is fed thereinto, whereby the mixture can be started with a thin mixture.

The above-described solution entails, however, certain problems. Firstly, the closed construction of the pulping space is risky, particularly in the processing of crude masses. Consequently, upon discontinuing the ventilation of the pulping space, the disadvantages are significant for both the process and the device in question. Furthermore, because of the closed construction and the discharge of waste material through the bottom, the exhausting of the device is not fully reliable. Also, like constructions the prior art by similar principles, waste material is accumulated on the bottom of the device in a way that it hampers the operation of the mixer, possibly eventually breaking the mixer blades. Due to the closed construction, the service and maintenance of the device are also relatively difficult.

SUMMARY OF THE INVENTION

It is an aim of the mixing device of this invention to achieve a decisive improvement to the problems presented above and thus to raise substantially the level of knowledge in the field. To achieve this aim, the mixing device of the invention is primarily characterized in that at least for increasing the efficiency of the mixing means, e.g. for bringing it essentially apart from the waste material accumulating on the bottom of the second pulping space, the mixing device is connected with the second pulping space by a primary space extending outwards from the wall limiting the second pulping space.

The most important advantages of the mixing device of the invention are simplicity, reliability and ease of use, which are essential particularly in the demanding work environment in question. The mixing device of the invention is advantageous both in manufacture and in installation. Further, it allows for installation, service and maintenance work without causing notable stoppages in the total process, whereby the second pulping space equipped with a mixing device of the invention can be used continuously in comparison with present construction, only by changing the removably fixed mixing device. The mixing device of the invention reduces the service operations on the second pulping stage, because it is possible to eliminate the contact of the waste material accumulated on the bottom thereof with the mixing means.

BRIEF DESCRIPTION OF THE DRAWINGS

In the following description, the invention is illustrated in detail with reference to the appended drawings. In the drawings, FIG. 1 shows a longitudinal section of an advantageous mixing device in principal, and FIG. 2 shows a simplified operational chart of a process in which a mixing device of FIG. 1 is used.

DETAILED DESCRIPTION

The mixing device is intended for use for example, in a second a pulping space 1, such as a sieving or intermediate tank, basin or the like, for pulping at the second stage in a process of FIG. 2, the waste matter 2a of the pulping material being accumulated on the bottom thereof for discharge. For receiving the pre-pulped material, the second pulping space 1 is equipped with flow means 3, such as a tube, channel or the like, periodically by a valve arrangement 4 or the like, in connection with the first pulping space 5, such as a pre-slusher, pre-pulper or the like, for pulping at least at the first stage. The mixing device comprises a mixing means 6 with blades or the like which are arranged to rotate on the primary side of a sieving means 7, such as a punched plate, screen plate or the like, whereby the pulped material 2b, having passed through the sieving means 7, is conveyed from the secondary side of the sieving means 7 for further processing via an outlet assembly 8 by a suction effect, such as that caused by gravitation, a pump or the like. For improving the efficiency of the mixing means 6, e.g. by bringing it essentially apart from the waste material 2a accumulating on the bottom of the second pulping space 1, the mixing device is connected with the second pulping space 1 by a primary space 10 extending outwards from the wall 1a limiting the second pulping space 1.

With reference to the longitudinal section principally shown FIG. 1, the mixing means 6 is disposed rotable around a rotation axis a which is transverse to the sieving surface 7a of the sieving means 7. The primary space 10 thus comprises substantially a flow chamber 10a which is substantially parallel to the rotation axis a, the mixing means 6 and the sieving means 7 being arranged in connection with the primary space 10. Further, the flow chamber 10a of the primary space 10 is connected with the second pulping space 1 through an opening 0 substantially above the bottom in the wall 1a limiting the second pulping space 1 at its first end, whereby the mixing means 6 and the sieving means 7 are disposed in connection with the wall surface towards the second end of the flow chamber 10a.

In the presented embodiment, the mixing means 6 is arranged rotably around the substantially vertical sieving surface 7a of the sieving means 7, whereby the primary space 10 comprises a flow chamber 10a which extends substantially in the horizontal direction from the opening 0 in the vertical wall 1a of the second pulping space and has a constant inner diameter.

With reference to FIG. 2, the pulping material for the process shown therein is arranged to be pre-treated before the mixing means 6 and the sieving means 7. It is thus conveyed from the second pulping space 1 to a cylindrical screen 11 operating as a pre-sieving means, whereby, the efficiency of the mixing means 6 being improved by primary sieving of the material conveyed thereto, the preliminary sieving flow 2c of the pulping material takes place through the primary space 10. In an advantageous embodiment of the mixing device of the invention, the primary space 10 thus comprises, apart from the flow chamber 10a, also an entrance chamber 10b, whose flow conditions differ substantially from those in the flow chamber 10a for improving the efficiency of the primary sieving flow 2c through the entrance chamber 10b.

In an advantageous embodiment shown particularly in FIG. 1, the free cross-sectional area A1 of the flow chamber 10a is totally smaller than the effective cross-sectional area A2 of the mixing means 6 towards the flow direction a. Further, the flow chamber 10a is arranged to convey the flow substantially to the middle part of the mixing means 6 and the entrance chamber 10b, in a corresponding manner, to act on the edge parts of the mixing means 6.

In an advantageous embodiment shown in FIG. 1, the mixing means comprises a frame 12 forming a substantially closed structure, which has a preferably circular. cross-section in the flow direction a. The frame 12 is provided with elements forming at least part of the primary space 10, the mixing means 6, the sieving means 7 and the outlet assembly 8. In the embodiment shown in FIG. 1, the tubular element forming the flow chamber 10a is attached directly to the wall 1a of the second pulping space 1. The drawings also show the wall arrangement of the frame in broken lines, whereby also the flow chamber can be integrated in the frame. As shown in FIG. 1, the mixing means is further arranged to be removably fixed by a screw connection 12a to the wall 1a of the second pulping space 1.

It is obvious that the invention is not limited to the embodiments presented above but it can be modified within the basic idea even to a great extent. The mixing device of the invention can naturally be attached to a variety of pulping spaces, whereby the consistency of the pulping mass will naturally be decisive in the applicability of the invention. The mixing means can thus be installed for example in a closed pulping space as described in the beginning of the description, or in a processing space for sieving or the like. The mixing device of the invention can naturally be arranged in the longitudinal direction to be for example curvilinear or in an inclined position. Thanks to the removable attachment of the mixing device, the device can be manufactured of a variety of materials by suitable manufacturing techniques.

I claim:

1. A waste paper pulping and separating apparatus for use in a pulping process comprising:

a first pulping chamber for partially pulping waste paper feed material;

flow path means connecting said first pulping chamber to a second pulping chamber for transporting said feed material, at least partially pulped in said first pulping chamber, from said first pulping chamber to said second pulping chamber for further pulping;

said second pulping chamber having a bottom discharge means for separating out a waste material component from said pulped material collected in the second pulping chamber, and tubular flow chamber means for transporting remaining pulp material to a separation chamber positioned adjacent to said second pulping chamber, said tubular flow chamber means having an inlet opening in a wall of said second pulping chamber at a distance above said bottom discharge means, said tubular flow chamber means extending through said wall into said separation chamber and having an outlet terminating centrally and at a distance from a mixing means, said tubular flow chamber means having a flow cross sectional area smaller than an effective cross sectional area of said mixing means;

a sieving means located directly downstream of said mixing means in said separation chamber;

an outlet positioned in a wall of said separation chamber to discharge a portion of said remaining pulp material, not passing through said sieving means, from a flow space defined by an inner wall of said separation chamber and said tubular flow chamber means; and an outlet assembly for transferring material passing said sieving means downstream of said sieving means.

2. An apparatus according to claim 1 wherein at least a central flow point of the tubular flow chamber means is located in the same horizontal axis as a center part of the mixing means.

3. An apparatus according to claim 1 further comprising a frame having a circular cross-section, said frame supporting the outlet, the mixing means, the sieving means and the outlet assembly, and wherein the mixing means rotates around a rotational axis transverse to a sieving surface of the sieving means.

4. An apparatus according to claim 3 wherein said frame and a vertical wall of the second pulping chamber form the structure of the separation chamber.

5. An apparatus according to claim 4 wherein said frame is removably fixed to said vertical wall of said second pulping chamber by a screw connection.

6. An apparatus according to claim 1 further comprising a pre-sieving means for receiving said discarge from said outlet.

7. An apparatus according to claim 1 wherein the pre-sieving means is a cylindrical screen.

8. An apparatus according to claim 1 wherein said partially pulped feed material from the first pulping chamber is transported periodically via said flow path means from the first pulping chamber to the second pulping chamber through a valve means.

9. An apparatus according to claim 6 wherein said pre-sieving means is a vibrating screen.

* * * * *